United States Patent

Wishnie

[15] 3,676,310

[45] July 11, 1972

[54] PROCESS FOR ELECTROCHEMICAL MACHINING EMPLOYING A DIE OF A SPECIAL ALLOY

[72] Inventor: Frederick T. Wishnie, Seaford, N.Y.

[73] Assignee: Eutectic Welding Alloys Corporation, Flushing, N.Y.

[22] Filed: July 9, 1970

[21] Appl. No.: 53,644

Related U.S. Application Data

[62] Division of Ser. No. 664,227, Aug. 2, 1967, abandoned.

[52] U.S. Cl. ........................ 204/143 M, 75/159, 204/293
[51] Int. Cl. ................. B23p 1/00, B01r 3/06, C22c 9/06
[58] Field of Search ..................... 204/293, 143 M; 75/159

[56] References Cited

UNITED STATES PATENTS

| | | | |
|---|---|---|---|
| 3,293,029 | 12/1966 | Broderick et al. | 75/154 X |
| 2,891,860 | 6/1959 | Woolard | 75/159 |
| 2,911,298 | 11/1959 | Woolard | 75/159 |
| 3,392,017 | 7/1968 | Quaas et al. | 75/159 |
| 2,768,893 | 10/1956 | Bredzs | 75/159 |
| 2,755,182 | 7/1956 | Cape | 75/159 |
| 2,074,604 | 3/1937 | Bolton et al. | 75/159 |

*Primary Examiner*—John H. Mack
*Assistant Examiner*—Regan J. Fay
*Attorney*—David R. Murphy

[57] ABSTRACT

Electro-chemical machining die of an alloy comprising the following constituents in the following range of percentages by weight: nickel 5 to 27 percent, castability promoting elements 1.2 to 8 percent, hardness promotion elements .5 to 9.5 percent, with the balance being copper.

4 Claims, No Drawings

PROCESS FOR ELECTROCHEMICAL MACHINING EMPLOYING A DIE OF A SPECIAL ALLOY

CROSS REFERENCE TO RELATED APPLICATIONS

This is a divisional of U. S. application Ser. No. 664,227, filed Aug. 2, 1967, now abandoned and refiled as a continuation Ser. No. 73,074, filed Sept. 17, 1970.

The invention relates to an electro-chemical machining die of a copper base alloy with additions of nickel, hardness promoting elements and castability promoting elements.

Heretofore, it has been known that copper tungsten sintered dies have been used for electro-chemical machining. These dies are fabricated by the press forming of sintered copper tungsten powder. This process is expensive and does not lend itself to the maintenance of close tolerances. Also, when the copper tungsten sintered dies are used with an insufficient electrolyte, arcing occurs on the die which causes damaging pit marks on these dies. Heretofore no alloy has been available for the repair of these dies and when these expensive dies were damaged they were scrapped.

It is the general object of this invention to avoid the foregoing prior art practices by the provision of an electro-chemical machining die of an improved alloy.

Another object of this invention is to provide an electro-chemical machining die suitable for use with highly corrosive electrolytes.

Yet another object of this invention is to provide an electro-chemical machining die with good electrical conductivity.

Still another object of this invention is to provide an electro-chemical machining die that has good wear resistance.

The experimentation preceding this invention commenced with the objective of discovering an alloy system that would have all of the essential properties of the copper tungsten sintered structure e.g. high corrosion resistance, good electrical conductivity and high wear resistance, but which alloy system would in addition be a castable homogeneous alloy capable of machining and most important capable of being deposited by welding on copper tungsten sintered base materials. In the course of the research and experimentation a number of alloy systems were employed. After suitable testing it was determined that a copper system with moderate nickel additions produced the best results for good machinability, electrical conductivity and corrosive resistance.

To the basic copper nickel system various elements with high hardness were added to increase the wear resistance. The majority of the alloy systems with these additional elements were found to lack the required machinability and the desired high electrical conductivity. After some lengthy experimentation it was found that particular weight percent ranges of hardness promoting elements such as chromium, silicon and iron, when added to the basic copper nickel alloy system, produced desired results in maintaining machinability, electrical conductivity and corrosion resistance while imparting to the overall alloy system good resistance to wear. In connection with this phase of the work it was discovered that the cumulative total of the alloy additions with high hardness characteristics to be added to the alloy system of the invention must not be greater than 9.5 percent by weight.

Finally, the alloy system had to be provided with castability and superior surface wetting properties.

The final alloy system had to be castable as a homogeneous alloy system without the segregation or separation of elements. Also, since the end alloy system was to be utilized as a welding alloy especially directed to copper tungsten sintered base materials the end alloy had to have superior surface wetting characteristics. After additional modifications to various alloy systems comprising the foregoing elements, it was discovered that additions of castability promoting elements such as phosphorous and boron in controlled weight percent ranges with a sum total weight percent additions below 8 percent provide good castability and superior surface wetting characteristics. In addition the resultant alloy system of the invention was found to have good flow characteristics, good fluxing action and exceptional deoxidation properties.

Finally, it was found that small additions of tin improved the overall flow characteristics of the alloy system.

The alloy system of the invention comprises the following elements in the weight percentages indicated.

| Element | Range Weight % | Preferred Range Weight % |
| --- | --- | --- |
| Nickel | 5 to 21 | 12 to 20 |
| Castability Promoting Elements | 1.2 to 8 | 1.85 to 6.2 |
| Hardness Promoting Elements | .5 to 9.5 | 1.7 to 5.4 |
| Tin | 0 to .6 | 0 to .3 |

Typical hardness promoting elements of the foregoing alloy system comprise the following elements in the weight percent indicated:

| Element | Broad Range | Preferred Range |
| --- | --- | --- |
| Chromium | .5 to 5 | .7 to 2.5 |
| Silicon | 0 to 3 | .7 to 1.5 |
| Iron | 0 to 3 | .3 to 1.6 |

Typical castability promoting elements of the foregoing alloy system comprise the following elements in the weight percent indicated:

| Element | Broad Range | Preferred Range |
| --- | --- | --- |
| Phosphorus | 1 to 7.5% | 1.5 to 3.4% |
| Boron | .2 to 2% | .35 to 1.3% |

According to the present invention, an electro-chemical machining die has been provided which is suitable for use with highly corrosive electrolytes, which has good electrical conductivity and which has good wear resistance.

I claim:

1. In a process for electro-chemical machining the use of a die of an alloy having the following constituents in the following range of percentages by weight:

| | |
| --- | --- |
| Nickel | 5 to 27% |
| Castability Promoting Elements | 1.2 to 8% |
| Hardness Promoting Elements | .5 to 9.5% |
| Copper | Balance |

2. In a process of claim 1 for electro-chemical machining the use of a die of an alloy having the following constituents in the following range of percentages by weight:

| | |
| --- | --- |
| Nickel | 12 to 20% |
| Castability Promoting Elements | 1.85 to 6.2% |
| Hardness Promoting Elements 1.7 to 5.4% | |
| Copper | Balance |

3. In a process for electro-chemical machining the use of a die of an alloy having the following constituents in the following range of percentages by weight:

| | |
| --- | --- |
| Nickel | 5 to 27% |
| Chromium | .5 to 5% |
| Silicon | 0 to 3% |
| Iron | 0 to 3% |
| Phosphorus | 1 to 7.5% |
| Boron | .2 to 2.0% |
| Tin | 0 to .6% |
| Copper | Balance |

4. In a process of claim 3, for electro-chemical machining the use of a die of an alloy having the following constituents in the following range of percentages by weight:

| | |
|---|---|
| Nickel | 12 to 20% |
| Chromium | .7 to 2.5% |
| Silicon | .7 to 1.5% |
| Iron | .3 to 1.6% |
| Phosphorus | 1 to 7.5% |
| Boron | .35 to 1.3% |
| Tin | 0 to .6% |
| Copper | Balance |

* * * * *